United States Patent [19]

Wetzel

[11] Patent Number: 4,718,001
[45] Date of Patent: Jan. 5, 1988

[54] APPARATUS FOR CONTROLLING A MACHINE TOOL

[75] Inventor: Friedrich Wetzel, Heroldsbach, Fed. Rep. of Germany

[73] Assignee: Siemens Aktiengesellschaft, Berlin and Munich, Fed. Rep. of Germany

[21] Appl. No.: 805,326

[22] Filed: Dec. 5, 1985

[30] Foreign Application Priority Data

Dec. 13, 1984 [DE] Fed. Rep. of Germany ....... 3445511

[51] Int. Cl.$^4$ ............................................. G05B 19/403
[52] U.S. Cl. .................................... 364/169; 364/474
[58] Field of Search ............... 364/136, 141, 167, 168, 364/169, 170, 171, 474, 475, 513; 318/573

[56] References Cited

U.S. PATENT DOCUMENTS

| | | | |
|---|---|---|---|
| 4,506,331 | 3/1985 | Kishi et al. | 364/169 |
| 4,543,625 | 9/1985 | Nozawa et al. | 364/169 |
| 4,581,698 | 4/1986 | Jaswa | 364/169 |

Primary Examiner—Jerry Smith
Assistant Examiner—Allen MacDonald
Attorney, Agent, or Firm—Kenyon & Kenyon

[57] ABSTRACT

In order to execute several parts programs of a machine tool with one control, the parts programs are fed continuously and set by set to memory areas of a working memory, each area specific to a particular parts program. An interpolating converter interrogates cyclically the currently stored sets and determines from them, step by step, the chords required for the control of the axes of the machine tool. The number of chords per set depends on the respective set. Once all chords of a set are determined, a new set is fed to the working memory.

16 Claims, 1 Drawing Figure

APPARATUS FOR CONTROLLING A MACHINE TOOL

TECHNICAL FIELD

The invention relates to apparatus for the simultaneous control of the axes of a machine tool in accordance with predetermined parts programs, each of which contains a sequence of sets which can be subdivided by an interpolating converter into a number of chords specific to a set and which serves for controlling a predetermined axis of the machine tool.

BACKGROUND OF THE INVENTION

Apparatus for simultaneously controlling the axes of a machine tool is known in principle from German Application No. 34 02 706. However, for the various parts programs which must be worked up simultaneously, several numerical controls must always be provided. This, in turn, requires the interaction of the numerical controls to be coordinated via a matching control.

It is an object of the invention to develop apparatus for controlling a machine tool in such a way that a single numerical control determines simultaneously the control signals for all axes of the machine tool. Among the axes included are also the auxiliary axes of tool changers, loading devices, etc.

SUMMARY OF THE INVENTION

The foregoing problem is obviated by the present invention which comprises: (a) at least one working memory having a plurality of memory areas, each area assigned to a particular parts program; (b) means for continuously impressing the sets of each parts program on the memory area specific to the particular parts program; (c) means for cyclically interpolating the currently stored set of a respective parts program by the interpolating converter; and (d) means to impress a subsequent set of the respective parts program on the respective memory area of the working memory after the completion of the number of cycles for the interpolation of the currently stored set.

A fast control is made possible by either one of two further features: (a) advancement within each cycle can be triggered by an acknowledgement signal of the interpolating converter which indicates the determination of a respective chord of the currently stored set; or (b) the impression of a subsequent set of the respective parts program on the working memory can be triggered by an acknowledgement signal of the interpolating converter which indicates the determination of the last chord of the currently stored set.

It is possible to keep the cycle time constant by triggering the start of each cycle by a clock signal of a clock generator. Further, by blocking the clock generator prior to the start of the cycles, the first set of each parts program can be impressed in a simple manner on the respectively corresponding memory area of the working memory.

Advantageously, the sets of each parts program can be fed into the working memory via buffer memories, each specific to a particular parts program, which contain the subsequent sets of each parts program immediately following the respective currently stored sets. This assures a transfer of the sets of the parts programs to the interpolating converter without problems. This is especially advantageous if the latter is preceded by a converter for set processing, the processing rhythm of which is independent of that of the interpolating converter.

Further, a position control can be interposed between the interpolating converter and the machine tool to assure a motion cycle of the machine tool with high positioning accuracy.

Still further, the interpolating converter can be assigned auxiliary memories, each specific to a particular parts program, which can take over storage functions required for the interpolation process of the interpolating converter in a simple manner.

BRIEF DESCRIPTION OF THE DRAWING

For a better understanding of the invention, reference is made to the following description of an exemplary embodiment thereof and to the accompanying drawing, wherein.

DETAILED DESCRIPTION

Figure 1:
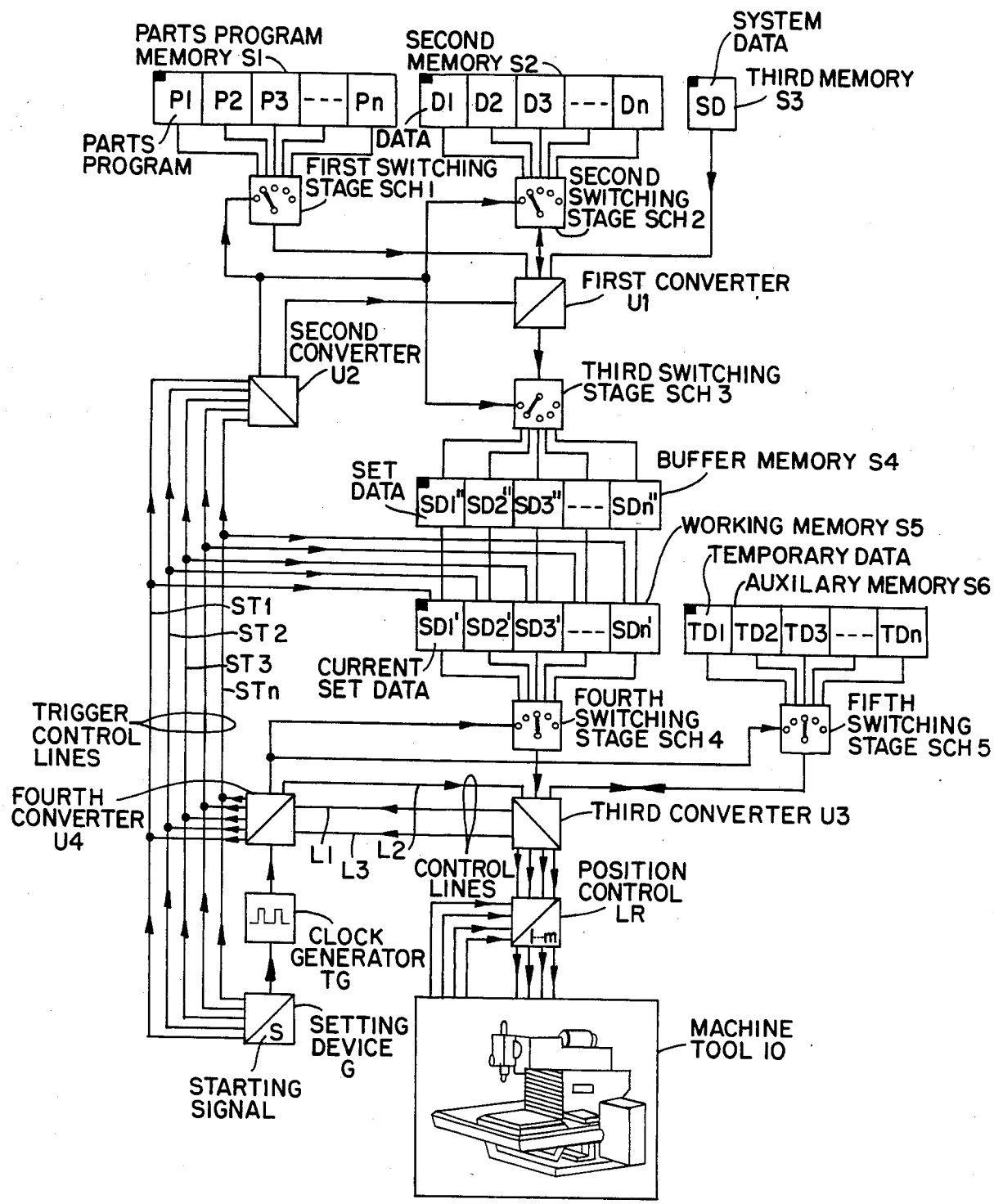
FIG. 1 is a block diagram of a machine tool and an associated control apparatus of the present invention.

FIG. 1 shows a machine tool 10 including the associated machine tool control. Note, that the illustration is limited to the elements essential for the operation of the invention, for instance, input and output elements, such as control panels and indicating devices, are not shown for the sake of clarity.

A parts program memory S1, divided into n memory areas, stores a plurality of parts programs P1 . . . Pn set by set, each of which is provided for controlling one of the simultaneous motion cycles of the machine tool 10. Sets are understood here to be coordinates of two subsequent machining points which are supplemented by further parameters, for instance, feed velocities. The distance of the machining points of a set from each other can be completely different here, so that the sets require interpolation for the continuous control of the machine tool 10. Interpolation leads to individual chords, which are understood to mean short motion sections which are sufficiently accurate for the specific application.

Data D1 . . . Dn, specific for the plurality of parts programs P1 . . . Pn, is stored in a second memory S2 which is also divided into n memory areas. The data D1 . . . Dn are assigned to the parts programs P1 . . . Pn in an one-to-one fashion such that the first data D1 are assigned to the first parts program P1, and so on, and the last data Dn are assigned to the last parts program Pn. In addition, data SD which is typical of the system, for instance, zero shift data, tool correction data, and machine data, are stored in a third memory S3.

The parts programs P1 . . . Pn are coded in a user-friendly manner which cannot be interpolated directly. For this reason, the parts programs P1 . . . Pn are fed, together with the system data SD, to a first converter U1 for set processing into a form which is relatively easy to interpolate. As shown, a parts program (in the embodiment example shown, the second parts program P2) is fed to the first converter U1 via a first electronic switching stage SCH1 (indicated in FIG. 1 as a multistage switch for the sake of clarity). Via a second similar switching stage SCH2, the first converter U1 is bidirectionally connected to the second memory S2 so that data specific for the respective parts program (i.e., in this case, the second data D2) can be fed to the first converter U1, or the second memory S2 with its respective memory/storage area can serve the first converter U1 as a working memory for the processing or conversion.

The selection of the switch positions of the two switching stages SCH1, SCH2 is determined by a second converter U2 (a set processing control mechanism) by means of control signals which can be triggered by the former. The first converter U1 is likewise made operative for the processing of the sets upon the initiative of the second converter U2.

The first converter U1 for the set processing is followed by a third electronic switching stage SCH3, the switch position of which is determined synchronously with the switch position of the first two switching stages SCH1 and SCH2 by the second converter U2 in a like manner as described above. In the embodiment example, the processed sets of the second parts program P2 thus arrives in a memory area designated for second set data SD2" of a buffer memory S4 which stores a plurality of set data SD1" ... SDn" in an one-to-one fashion for all parts programs P1 ... Pn in n memory areas. The memory areas of the buffer memory S4 are each connected to a respective memory area of a working memory S5 which contains current set data SD1' ... SDn' for the respective parts programs P1 ... Pn, in an one-to-one fashion, for the sets current for the machine tool 10. The set data SD1" ... SDn" always represent the set data following the current set data SD1' ... SDn'.

The current set data SD1' ... SDn' feed from the working memory S5 through a fourth electronic switching stage SCH4 to an interpolating converter U3 (an interpolator) which accomplishes the interpolation, described at the outset, of the processed sets into chords. The interpolator U3 is connected via a fifth electronic switching stage SCH5 to an auxiliary memory S6 comprising n memory areas. Each memory area of the auxiliary memory S6 serves for receiving temporary data TD1 ... TDn, each specific to a respective parts program P1 ... Pn.

The fourth and fifth switching stages SCH4, SCH5 are operated synchronously by a fourth converter U4 provided as the interpolator control mechanism wherein the switch positions of the switching stages SCH4, SCH5 are each traversed cyclically from 1 to n. In the embodiment example shown, the switch position of the fourth and fifth switching stages SCH4, SCH5 is chosen so that the third current set data SD3' of the third parts program P3 are fed to the interpolator U3, and, at the same time, the respective temporary data TD3 of the auxiliary memory S6 are available. As soon as the interpolator U3 has available current set data, i.e., the third current set data SD3' and the associated temporary data TD3, the interpolator U3 determines continuously a chord of the respective current set. If, for instance, k chords are to be determined until the current set is executed, it is necessary that the fourth and fifth switching stages SCH4, SCH5 traverse k cycles for this set.

Once the interpolator U3 has determined a chord, this is communicated, via a control signal on a first control line L1, to the fourth converter U4 (designated above as the interpolator control mechanism). The control signal causes, via the fourth converter U4, an advance by one step always of the fourth and fifth switching stages SCH4, SCH5 to the next switch position. The fourth converter U4, in turn, feeds a signal for triggering a new interpolation process to the interpolator U3 via a second control line L2. Note, in the embodiment example shown, the control signals on the first control line L1 always result in the fourth and fifth switching stages SCH4, SCH5 switching from the first current set data SD1' to the next current set data and through to the last current set data SDn'. However, a jump-back to a new cycle during interpolation is triggered, not by a control signal on the first control line L1, but, is always accomplished by a pulse of a control signal transmitted to the fourth converter U4 by a clock generator TG.

If the interpolator U3 has worked up a complete set for one of the parts programs P1 ... Pn, a control signal to this effect is communicated via a third control line L3 to the interpolator control mechanism U4, which thereupon communicates, via a respective trigger control line ST1 ... STn, to the second converter U2 (the set processing control mechanism) which of the parts program P1 ... Pn can then trigger a new set for processing. The control signal also causes a new set to be read in from the buffer memory S4 into the working memory S5 as a replacement for the respective worked-up set. The number of trigger control lines ST1 ... STn corresponds one to one with the number of parts programs P1 ... Pn. Instead of parallel trigger control lines, a single trigger control line is also conceivable which would carry identification signals specific to the particular parts programs.

In the embodiment example, if the interpolator U3 recognizes that the third current set data SD3' is worked up, a control signal to this effect on the third control line L3 is sent to the fourth converter U4. This causes the working memory S5 to be loaded by the fourth converter U4 via the trigger control line ST3 with the next set data SD3" of the respective parts program P3 from the buffer memory S4 and causes the second converter U2 to switch the first and second switching stages SCH1, SCH2 to the pertinent parts program, in this case, the third parts program P3. It is evident therefore that the first and second switching stages SCH1, SCH2 must in no way be switched cyclically and continuously but are switched as desired upon the respective request. The first converter U1 is further triggered by each set acknowledgement by the second converter U2 to supply the buffer memory S4 immediately with a new set following the then current set.

In the illustration, a setting device G is further provided which, in the presence of a starting signal S, first blocks the clock generator TG and causes via the trigger control lines ST1 ... STn, initially successively, the reading-in of the respective processed set data SD1' ... SDn' into the working memory S5 and SD1"-SDn" into the buffer memory S4. Only thereupon is the clock generator TG switched operative, whereupon the fourth and fifth switches SCH4, SCH5 start their first cycle beginning with the first current set data SD1'.

The chords determined by the interpolator U3 for each of the axes of the machine tool 10, m axes in the example shown, control the axes via a position control LR which evaluates acknowledging signals from the machine tool 10 regarding the actual position of the axes.

It is to be understood that the embodiments described herein are merely illustrative of the principles of the invention. Various modifications may be made thereto by persons skilled in the art without departing from the spirit and scope of the invention.

What is claimed is:

1. Apparatus for the simultaneous control of the axes of a machine tool in accordance with predetermined parts programs, each of which contains a sequence of sets which can be subdivided into a number of chords specific to a set which serve for controlling a predetermined axis of the machine tool, comprising:
   (a) at least one working memory having a plurality of memory areas, each area assigned to a particular parts program;
   (b) means for loading in a queue fashion the sets of each parts program into the respective corresponding memory area one set at a time;
   (c) means for cyclically interpolating the currently stored set of a respective parts program for a predetermined number of cycles so as to subdivide said set into a number of chords, equal to the number of cycles, specific to the set;
   (d) means for controlling the loading of a subsequent set of a respective parts program into the respective corresponding memory area of the working memory after the completion of the predetermined number of cycles for the interpolation of the currently stored set; and
   (e) means for controlling the axes of the machine tool by utilizing the chords determined by the interpolation of the sets of each parts program.

2. Apparatus as set forth by claim 1, wherein the means for cyclically interpolating comprises means for triggering an advance from one cycle to the next of the predetermined number of cycles for the interpolation of the currently stored set of a respective parts program via an acknowledgement signal indicating the determination of a respective chord of the currently stored set.

3. Apparatus as set forth by claim 2, wherein the means for controlling the loading comprises means for triggering the loading of a subsequent set of a respective parts program via an acknowledgement signal indicating the determination of the last chord of the currently stored set.

4. Apparatus as set forth by claim 3, further comprising a clock generator which triggers the start of each cycle of the predetermined number of cycles for the interpolation of the currently stored set of a respective parts program via a clock signal transmitted to the means for cyclically interpolating.

5. Apparatus as set forth by claim 4, further comprising means for loading a respective first set of each parts program, prior to the start of the interpolation of the sets, into the respective corresponding memory area of the working memory.

6. Apparatus as set forth by claim 5, further comprising a plurality of buffer memories, each assigned to a particular parts program, from which the sets of each parts program are loaded, under the direction of the means for controlling the loading, into the respective corresponding memory area of the working memory and which contain the subsequent sets of each parts program immediately following the respective currently stored sets.

7. Apparatus as set forth by claim 6, further comprising means for processing the sets of each parts program before the sets are in the respective corresponding buffer memory so that the sets are in a form which can be more easily interpolated.

8. Apparatus as set forth in claim 7, wherein the means for controlling the axes comprises a position control interposed between the means for cyclically interpolating and the machine tool which controls the axes of the machine tool by using the chords determined by the interpolation of the sets of each parts program and signals from the machine tool regarding the actual position of the axes.

9. Apparatus as set forth by claim 2, further comprising a clock generator which triggers the start of each cycle of the predetermined number of cycles for the interpolation of the currently stored set of a respective parts program via a clock signal transmitted to the means for cyclically interpolating.

10. Apparatus as set forth by claim 1, wherein the means for controlling the loading comprises means for triggering the loading of a subsequent set of a respective parts program via an acknowledgement signal indicating the determination of the last chord of the currently stored set.

11. Apparatus as set forth by claim 10, further comprising a clock generator which triggers the start of each cycle of the predetermined number of cycles for the interpolation of the currently stored set of a respective parts program via a clock signal transmitted to the means for cyclically interpolating.

12. Apparatus as set forth by claim 1, further comprising a clock generator which triggers the start of each cycle of the predetermined number of cycles for the interpolation of the currently stored set of a respective parts program via a clock signal transmitted to the means for cyclically interpolating.

13. Apparatus as set forth by claim 1, further comprising means for loading a respective first set of each parts program, prior to the start of the interpolation of the sets, into the respective corresponding memory area of the working memory.

14. Apparatus as set forth by claim 1, further comprising a plurality of buffer memories, each assigned to a particular parts program, from which the sets of each parts program are loaded, under the direction of the means for controlling the loading, into the respective corresponding memory area of the working memory and which contain the subsequent sets of each parts program immediately following the respective currently stored sets.

15. Apparatus as set forth by claim 1, further comprising means for processing the sets of each parts program before loading the sets into the respective corresponding memory area of the working memory so that the sets are in a form which can be more easily interpolated.

16. Apparatus as set forth in claim 1, wherein the means for controlling the axes comprises a position control interposed between the means for cyclically interpolating and the machine tool which controls the axes of the machine tool by using the chords determined by the interpolation of the sets of each parts program and signals from the machine tool regarding the actual position of the axes.

* * * * *